United States Patent [19]
Horowitz

[11] 3,992,812
[45] Nov. 23, 1976

[54] TOPIARY SHAPING FRAME

[76] Inventor: Alvin Edward Horowitz, 2320 SW. 23 Ave., Miami, Fla. 33145

[22] Filed: Apr. 21, 1975

[21] Appl. No.: 569,798

[52] U.S. Cl. .................................. 47/45; 47/33
[51] Int. Cl.² ........................................ A01G 17/06
[58] Field of Search .............. 47/33, 34, 34.4, 38, 47/34.12, 41, 43, 44, 23, 29, 45–47; 248/27.8; 256/66, 22

[56] References Cited
UNITED STATES PATENTS

| 248,519 | 10/1881 | Snyder | 47/41 |
| 873,279 | 12/1907 | Weber-Illig | 47/33 X |
| 2,113,523 | 4/1938 | White | 47/38 |
| 2,121,173 | 6/1938 | MacPherson | 47/38 |
| 2,140,862 | 12/1920 | Sumner | 47/34.4 |
| 2,193,425 | 3/1940 | Lake | 47/33 |
| 2,279,735 | 4/1942 | Gates | 47/33 |
| 3,793,771 | 2/1974 | Slaughter | 47/26 X |
| 3,828,472 | 7/1974 | Vermuelen | 47/34 R |
| D30,870 | 5/1899 | Geiger | 47/33 |

FOREIGN PATENTS OR APPLICATIONS

| 110,004 | 10/1964 | Netherlands | 47/33 |
| 95,308 | 1/1960 | Norway | 47/34 |
| 10,671 | 5/1912 | United Kingdom | 47/47 |
| 11,979 | 5/1913 | United Kingdom | 47/46 |
| 772,874 | 4/1957 | United Kingdom | 47/46 |
| 9,990 | 5/1906 | United Kingdom | 47/33 |
| 1,105,049 | 3/1968 | United Kingdom | 47/34.12 |

*Primary Examiner*—Edgar S. Burr
*Assistant Examiner*—James R. Feyrer
*Attorney, Agent, or Firm*—Ernest H. Schmidt

[57] ABSTRACT

A three-dimensional framework for use as a cutting and trimming guide in shaping plants into artistic form or topiaries. The supporting framework is provided with anchoring means permitting, use in small sizes, with potted plants, and, in larger sizes, with outdoor landscape plantings. In larger sizes, the framework is vertically separable into half portions permitting removal from a planting for re-use.

4 Claims, 6 Drawing Figures

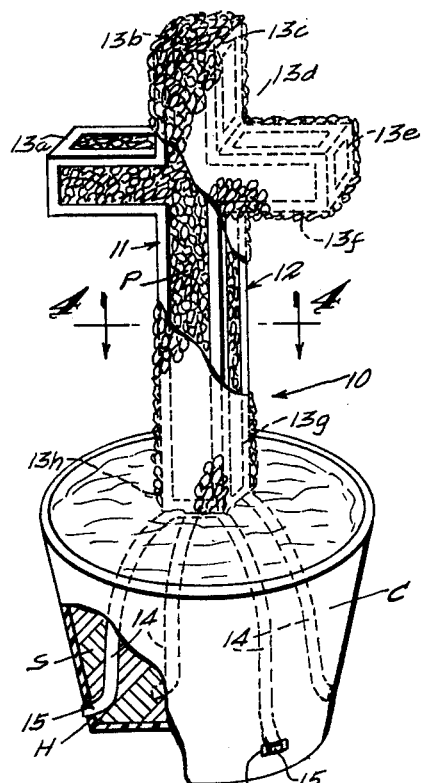
Fig. 1
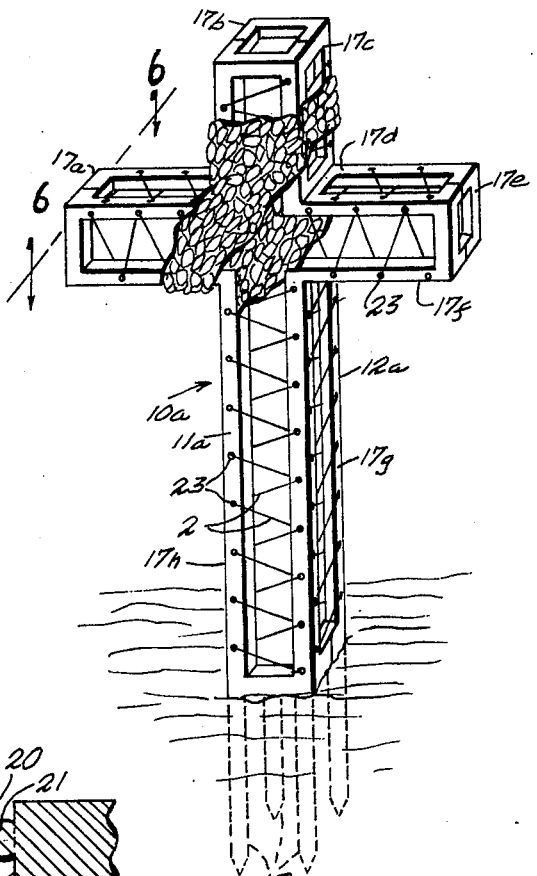
Fig. 2
Fig. 6
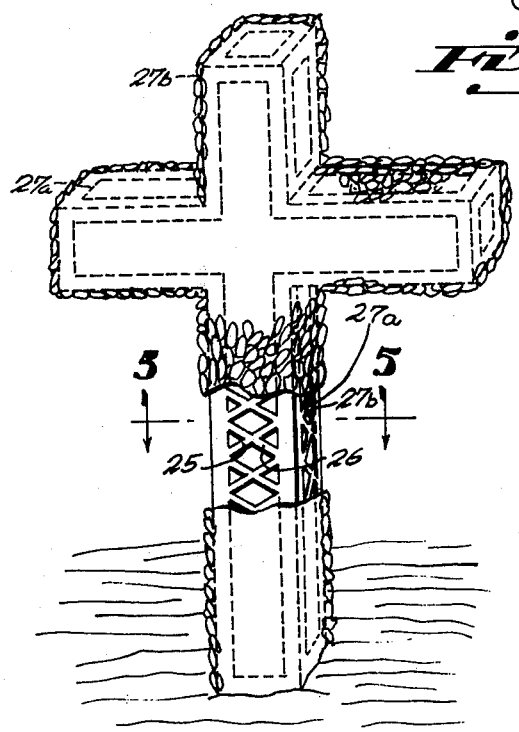
Fig. 3
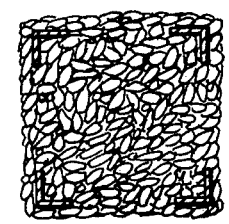
Fig. 4
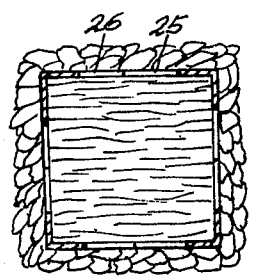
Fig. 5

TOPIARY SHAPING FRAME

This invention relates to the art of topiary and is directed particularly to novel and improved three-dimensional supporting frameworks facilitating the growing and shaping of plants, shrubs, and vines to assume a desired three-dimensional shape or form.

In landscape gardening, the art of clipping or trimming of shrubs or trees to decorative shapes such as those of animals, birds, or geometric forms is well known. Heretofore, such cutting and shaping has been accomplished for the most part without mechanical aids, the artistic ability of the gardener being relied upon to produce the desired shape. Because of the unique combination of skills, that is, artistic and horticultural, required to produce attractive topiaries, this type of landscaping has heretofore been rare and expensive to produce and maintain. It is, accordingly, the principal object of this invention to provide a three-dimensional shaping frame which serves as a guide for the growing and trimming of topiary plantings to eliminate the need of artistic ability, thereby enabling the average person to produce well-shaped topiaries at minimal cost.

A more particular object of the invention is to provide a three-dimensional topiary shaping frame suitable for use not only in shaping shrubbery and trees for landscaping purposes, but which is also well adapted for uses in smaller sizes for potted house plants and the like.

Another object of the invention is to provide a topiary shaping frame having support means along the sides for the growing of vines or climbing plants covering the framework along the outside surfaces thereof.

Another object of the invention is to provide a topiary shaping frame of the character described that can be filled with sphagnum, peat moss, mulch or the like, for the support of climbing plants, or in which seeds of decorative or leafy plants can be embedded for subsequent germination and growth to cover the framework in producing a topiary work of art.

Yet another object of the invention is to provide a topiary shaping frame having means for anchoring the base thereof to a pot in which an associated plant is to be grown to provide for firm anchoring thereof while the plant is growing and being cut and trimmed to the framework shape.

Still another object of the invention is to provide a three-dimensional topiary shaping frame, particularly for use in landscaping, which includes spike-like projections at the lower end or base for anchoring in the ground, and which is comprised of longitudinally-separable half-frame portions permitting ready assembly to or removal from a planting being trained and shaped as a topiary.

Another object of the invention is to provide a topiary shaping frame of the above nature wherein the framework comprises laterally-spaced members having pluralities of spaced openings along their lengths to permit the zig-zag threading therethrough of wire or the like to provide attachment means along the surfaces defining the outside shape of the framework for supporting vines or climbing plants used as the covering medium.

Another object of the invention is to provide a topiary shaping frame suitable for use either by nurserymen or florists in producing finished potted topiaries ready for display in the home, by the purchaser, or which, alternatively can be sold either separately as a kit with a container, seeds, etc. for use by the purchaser in growing his own topiaries.

Other objects, features and advantages of the invention will be apparent from the following description when read with reference to the accompanying drawings. In the drawings, wherein like reference numerals denote corresponding parts throughout the several views:

FIG. 1 illustrates, in perspective, a topiary shaping frame embodying the invention shown assembled to a plant container and illustrating how the growth of a contained plant growing within the frame will be shaped and trimmed thereto in the production of a potted topiary;

FIG. 2 is a modified form of a topiary shaping frame embodying the invention, of comparatively large size for landscaping use;

FIG. 3 is a modified form of the outdoor landscape topiary shaping frame illustrated in FIG. 2, wherein criss-cross lattice-work is provided between the main framework members for the support of vines and the like climbing plants used as a framework covering or filling medium;

FIG. 4 is a transverse cross-sectional view of the topiary shaping frame and plant illustrated in FIG. 1, taken along the plane 4—4 thereof in the direction of the arrows;

FIG. 5 is a transverse cross-sectional view taken along the plane 5—5 of FIG. 3 thereof in the direction of the arrows and illustrating the use of sphagnum moss or the like as a framework filler to support a multiplicity of seeds or small plants used as a plant cover for the entire framework; and FIG. 6 is a partial cross-sectional view taken along the line 6—6 of FIG. 2 in the direction of the arrows and illustrating details of one of the snap-fit junctures between the two halves of the separable framework.

Referring now in detail to the drawings, reference numeral 10 in FIG. 1 designates, generally, a topiary shaping frame assembled to an ordinary synthetic plastic plant container C in which is planted a plant P to be shaped as a topiary by the topiary shaping frame. The topiary shaping frame 10 will preferably be molded of a tough, synthetic plastic material as an open-work three-dimensional figure, the illustrated figure being that of a crucifix by way of example. It will be understood that whereas this particular three-dimensional configuration is illustrated and described herein by way of example of a topiary shaping frame embodying my invention, the invention is adapted to application to any other three-dimensional form or decorative shape, such as those of animals, birds, or geometric forms. Thus, as illustrated in FIG. 1 the shaping frame comprises a front framework portion 11 defining the front surface or area to which the topiary plant is to be confined, a rear framework portion 12 defining the rear surface thereof, said rear framework portion being laterally separated from said front framework portion by a distance corresponding to the depth of the topiary to be produced, and side framework portions 13a, 13b, 13c, 13d, 13e, 13f, 13g, 13h, etc., said side framework portions being sufficient in number, generally, to provide for self-supporting rigidity in the composite topiary shaping frame while at the same time providing appropriate guide means for containing and shaping the topiary plant during growth, shaping and trimming. In this connection, although the simple geometric shape of a crucifix is illustrated and described herein by way of example, the various peripheries of which lie in simple flat surfaces having straight edges, it will be understood that the front and rear framework portions 11, 12 and the interjoining side portion 13a, 13b, etc., could be appropriately curved wherever necessary to provide a topiary shaping frame defining any other three-dimensional ornamental shape having curved front, rear and side surface areas.

The cross-sectional shape of the various marginal elements of the front, rear and side framework portions 11, 12 and 13a, 13b, etc. may be right-angular, for example, as illustrated in FIG. 3, but are not necessarily limited to such configurations and may, alternatively for example, be round, square or rectangular. It is also to be understood that while the shaping frame 10 is illustrated as being fabricated of synthetic plastic material, it could also be made of metal wire or rod, wood or any other substantially rigid material without departing from the invention.

As further illustrated in FIG. 1, the topiary shaping frame 10 is integrally formed with a plurality, four in the example illustrated, of downwardly and outwardly-extending arcuate legs 14 equidistantly spaced and terminating in short out-turned feet 15 adapted to be hookingly received in the usual circularly-spaced water drain holes H at the bottom of a plant container C. As illustrated, the shaping frame legs 14, being somewhat resilient, can be assembled to the container C before filling the container with soil S for growing the plant P within said shaping frame. The topiary shaping frame is thus firmly anchored to the container C during the growth, training and shaping of the plant P to ultimately fill and cover said shaping frame with foliage, whereafter it will serve as an invisible and sturdy guide or pattern for trimming from time to time to maintain the topiary shape. As is hereinafter described with reference to the embodiment of the invention illustrated in FIGS. 2, 4 and 5, the topiary shaping frame 10, by the simple expedient, for example, of wrapping thin wire or cord about the periphery of the figure, could be used to support vines or the like climbing plants growing along the outside surfaces of the framework.

FIG. 2 illustrates a modified form of the invention, also in the shape of a crucifix by way of example, but of comparatively large size for outdoor landscape use. The topiary shaping frame 10a of FIG. 2 differs from that of FIG. 1 described above, in addition to being of a much larger size, in that the marginal front and rear framework portions 11a and 12a as well as the side framework portions 17a through 17h, as illustrated in FIG. 2, and their opposing hidden side elements not visible in FIG. 2, are preferably of rectangular cross-sectional shape for enhanced rigidity. The base or lower end of the topiary shaping frame 10a, furthermore, is formed at each corner with downwardly-extending anchoring prongs 18 adapted to be pressed into the ground for self-standing support.

Means is provided for separating the front and back halves of the topiary shaping frame 10a, for the purpose hereinafter appearing. To this end, as illustrated in FIG. 6, each of the side framework portions 17a, 17b, etc. is provided, midway along its length, with a ball and socket joint comprising a spheroidal socket 19 formed centrally in one of the dividing surfaces 20 of each of said side framework portions, and a spheroidal ball 21 extending centrally-outwardly of the other dividing surface 22 of each of said side framework portions. The size and configuration of the sockets and balls 19, 21 is such as to provide for snap-fit of the parts, enabling them to be locked together or unlocked simply by pushing together or pulling apart. It will thus be understood that two halves of the topiary shaping frame 10a can readily be dissembled or assembled as desired. This has the advantage of permitting the topiary shaping frame 10a to be removed from one plant and placed about another.

To provide for use of the topiary shaping frame 10a with vines or climbing plants to be shaped, the elements comprising the front and rear framework portions 11 and 12, and the side framework portion 13a, 13b, etc. are provided along their lengths with through openings 23 for the threading of wire 24 therethrough in zig-zag fashion, for example, serving as support means along outer surface portions of said frame for a plant to climb and cling to.

FIG. 4 illustrates a modification of the topiary shaping frame illustrated in FIG. 2, differing only in that instead of providing the openings 23 for optional use as described above, the topiary shaping frame 10b is integrally formed with criss-cross members 25, 26 extending between the outer surfaces defined by the various front and rear framework portions 11, 12 and side framework portions 27a, 27b, etc. The topiary shaping frame 10b is thus particularly well suited for use with vines or ivy planted along the outer sides of the base of said shaping frame and adapted to climb or creep along the surface areas thus provided to assume the three-dimensional external shape thereof. Alternatively, as best illustrated in FIG. 5, the interior of the shaping frame 10b can be filled with sphagnum, peat moss, mulch or the like to support seeds or seedlings used as a plant cover for the entire framework.

While I have illustrated and described herein only four forms in which my invention can conveniently be embodied in practice, it is to be understood that these forms are given by way of example only and not in a limiting sense. My invention, in brief, comprises all the embodiments and modifications coming within the scope and spirit of the following claims:

What I claim as new and desire to secure by Letters Patent is:

1. A two-piece topiary shaping frame comprising in combination, a front framework portion defining a front surface area for use as a guide in trimming a growing plant to a predetermined front configuration, a rear framework portion defining a rear surface for use as a guide in trimming a growing plant to a predetermined rear configuration, a plurality of side framework portions rigidly secured with respect to and extending between and separating said front and rear surface portions and defining therewith a peripheral surface area for use as a guide in trimming a growing plant to a predetermined side peripheral configuration, and means for removably securing lower end portions of the shaping frame to the earth in which a plant may be grown, said lower end portions securing means comprising a plurality of rigid prongs extending downwardly of the lower end of said shaping frame and being adapted to be pushed into the earth for self support, said side framework portions comprising releasable attaching means permitting complete separation of said front and rear framework portions substantially midway therebetween to allow the fitting of said shaping frame about and removal from a growing plant, selectively.

2. A topiary shaping frame as defined in claim 1, wherein said front, rear and side framework portions are integrally formed of marginal framework elements having right-angular cross-sectional shape.

3. A topiary shaping frame as defined in claim 2, wherein each of said elements are provided along their lengths with longitudinally spaced through openings for the zig-zag threading therethrough of a strand of flexible material serving as attachment means for clinging plants to be grown along the outside surface areas of the shaping frame.

4. A topiary shaping frame as defined in claim 1, wherein said releasable attaching means comprises a ball and socket joint provided along the length of each of said side framework portions.

* * * * *